(12) United States Patent
Perry et al.

(10) Patent No.: US 6,306,011 B1
(45) Date of Patent: Oct. 23, 2001

(54) SYSTEM FOR CONTROLLING THE SIZE AND SURFACE GEOMETRY OF AN ORIFICE

(75) Inventors: Winfield B. Perry, Lexington; Liam O'Shea, Burlington; Mark Wright, Stow, all of MA (US)

(73) Assignee: Dynetics Corporation, Woburn, MA (US)

( * ) Notice: Subject to any disclaimer, the term of this patent is extended or adjusted under 35 U.S.C. 154(b) by 0 days.

(21) Appl. No.: 09/075,644

(22) Filed: May 11, 1998

(51) Int. Cl.[7] .................................................. B24B 1/00
(52) U.S. Cl. ................................ 451/38; 451/36; 451/559
(58) Field of Search ................................ 451/38, 36, 559, 451/2, 76, 82, 403, 37, 60, 61; 51/8 H, 7, 317, 318

(56) References Cited

U.S. PATENT DOCUMENTS

| 2,310,488 | 2/1943 | Guite . | |
|---|---|---|---|
| 2,365,152 | 12/1944 | Stearman . | |
| 3,153,882 | 10/1964 | Millhiser . | |
| 3,521,412 | * 7/1970 | McCarty | 51/317 |
| 3,634,973 | * 1/1972 | McCarty | 51/2 R |
| 3,769,751 | * 11/1973 | Perry | 51/2 R |
| 3,886,697 | * 6/1975 | Fieldcamp | 51/317 |
| 4,005,549 | 2/1977 | Perry . | |
| 5,070,652 | * 12/1991 | Rhoades et al. | 51/7 |
| 5,076,026 | * 12/1991 | Mizuguchi et al. | 51/317 |
| 5,177,904 | * 1/1993 | Nagel et al. | 51/165.93 |
| 5,185,957 | * 2/1993 | Mizuguchi et al. | 51/59 SS |
| 5,807,163 | 9/1998 | Perry . | |

* cited by examiner

Primary Examiner—Lee Young
Assistant Examiner—Minh Trinh
(74) Attorney, Agent, or Firm—Samuels, Gauthier & Stevens, LLP

(57) ABSTRACT

A system to smooth and radius a microhole in a workplace to calibrate the mircohole which comprises means for preconditioning a microhole with a liquid abrasive slurry at a first station, means for flowing a calibration fluid through the preconditioned microhole and means for flowing a slurry through the microhole for a predetermined time based on the flow rate of the calibration fluid.

14 Claims, 10 Drawing Sheets

SYSTEM FOR CONTROLLING THE SIZE AND SURFACE GEOMETRY OF AN ORIFICE

BACKGROUND OF THE INVENTION

1. Field of the Invention

The invention relates to a system to radius and smooth a microhole, such as a microhole in a fuel injection nozzle.

2. Description of Related Art

In many applications, such as fuel injector nozzle tips, carburetor jets, cooling air flow through turbine engine components, lubricating oil metering for precision bearings and the like, metering of flow rates is of very great importance. However, due to manufacturing artifacts, it is of great difficulty. Even minute variations in manufacturing tolerances can produce substantial variations in flow resistance and flow.

Parts having fluid flow orifices are made by a wide variety of casting and machining procedures. For example, high quality investment castings are frequently employed for the manufacture of such parts. Even the high quality parts will have variations in dimensions, particularly wall thicknesses attributable to slight core misalignments or core shifting, and other variations in surface conditions, including surface roughness, pits, nicks, gouges, blow holes, or positive metal. In the extreme case, a very slight crack in a core can lead to a thin wall projecting into an internal passage. All these artifacts will substantially impede fluid flow.

Commonly employed machining methods, such as conventional drilling, electrical discharge machining and even less usual techniques as laser, electron beam and electrochemical techniques are not sufficiently precise to avoid the generation of substantial variations in flow resistance. Probably, the most precise of these, electrical discharge machining, will not produce perfectly uniform flow resistance because non-uniform EDM conditions are inevitable and may produce variations in size, shape, surface finish and hole edge conditions.

Such deviations are necessarily tolerated within broad limits and the attendant compromises in design freedom, performance and efficiency are accepted as unavoidable. For example, the delivery of fuel charges to internal combustion engines by pressurized fuel injection requires metering of flow through injector nozzles. The more precisely the flow can be regulated, the greater the fuel efficiency and economy of the engine operation.

At present, the design of such fuel injector nozzles is often based on the measurement of the actual flow resistance. The nozzles are segregated into different ranges of flow parameters to provide at least approximate matching of components within a range of deviation from defined tolerances. The inventory requirements for the matching of components is quite substantial and therefore very costly. In addition, a substantial number of components must be rejected as out of allowable deviations and must be reworked at considerable expense or discarded.

With diesel fuel injector nozzles, it has been found desirable to radius the inlet side of the injector microholes in order to eliminate stress risers and pre-radius the upstream edge to minimize changes in emissions over the design life of the nozzle. Conventional abrasive flow machining can effectively produce radii on microholes, but fine control of the final injector flow rate has been impossible to achieve. The high, putty-like viscosity and highly elastic character of conventional abrasive flow media are too radically different from the characteristics of diesel fuel to permit either in-process gauging or adaptive control of this process. Furthermore, the very small quantity of abrasive flow media required to produce the desired radius limits process resolution.

Briefly, in abrasive flow machining (AFM) of microholes the flow rate of the material does not correlate well to the flow rate of the target liquid. Therefore, the actual calibration of a microhole is a step-by-step fine tuning process. After radiusing and smoothing the microhole with AFM, the target liquid or calibration liquid is tested in the microhole, the microhole is further worked and the target liquid or calibration liquid is again tested, etcetera, until the target liquid tests correctly.

The aforementioned problems were overcome to a considerable degree with the system disclosed in PCT Publication WO 97/05989. This publication discloses the use of a liquid abrasive slurry having rheological properties. When the flow rate of the slurry through the microholes of a nozzle reaches a predetermined flow rate, the process stops and the microholes are properly radiused and smoothed.

SUMMARY OF THE INVENTION

The present invention embodies a system to radius and smooth a microhole which is based upon a statistically meaningful correlation between the time a liquid abrasive slurry flows through a microhole and the increase in calibration fluid flow rate. When the abrasive liquid slurry reaches a predetermined target time the microhole is properly calibrated.

In the system of the invention, a microhole is preconditioned with a liquid abrasive slurry at a first station. The flow rate of a calibration fluid through the preconditioned microhole is measured at a second station. At a third station the liquid abrasive slurry flows through the microhole a predetermined time. This predetermined time, at the third station, is based upon the measured flow rate of the calibration fluid at the second station. The correlation between the target increase in calibration flow rate and the slurry flow time is based upon prior experience with substantially the same slurry/calibration fluid/nozzle/microholes. Subsequently, at a fourth station the flow rate of the calibration fluid through the microhole is measured and this determines whether or not the microholes have been properly calibrated. The liquid slurry flow stations may be the same station or separate stations and the calibration flow stations may be the same or separate stations.

In a preferred embodiment, workpieces having microholes to be radiused and smoothed are removably secured in fixtures. The fixtures are each secured in a nest. Each nest is secured in a platform. The platform indexes the workpieces through a plurality of treatment stations.

In a particularly preferred embodiment, the platform is a carousel which rotates in an indexed fashion. An upper base plate is positioned over the carousel. Reciprocating rams having feed nozzles for carrying fluids, such as pneumatic air, liquid abrasive slurry and calibration fluid are ganged in the upper base plate. A lower base plate is positioned under the carousel and supports tooling fixtures. When a ram, nest and tooling fixture are aligned a treatment station is defined. When a workpiece is moved (indexed) into registration with a ram, the ram moves with a feed nozzle engaging the workpiece/nest and the nest moves and engages the tooling fixture. The fluid flows through the microholes in the workpiece and is discharged through the lower tooling fixture.

A programmable controller controls the movement of the carousel, the rams and the actuation of the feed nozzles.

The invention finds utility in the radiusing, polishing and smoothing of microholes in any workpiece, e.g. fuel injector nozzles, spinerettes. Although the preferred embodiment of the invention is described in reference to the radiusing and smoothing of microholes, it also includes the smoothing and polishing of non-circular apertures, i.e. rectangular slots, squares, elliptical configurations, etc. The square area of the non-circular apertures would typically be less than approximately 3 mm$^2$.

Any relative motion between the workpieces and the rams is within the scope of the invention. The workpieces can travel on any linear or curvilinear path. The workpiece can be fixed and the rams move along paths both parallel (linear) to the workpieces and perpendicular (reciprocal) to the workpieces. Alternatively, the rams can be fixed and the workpieces move both parallel and perpendicular to the rams.

DETAILED DESCRIPTION OF THE PREFERRED EMBODIMENT(S)

The System

Figure 1:
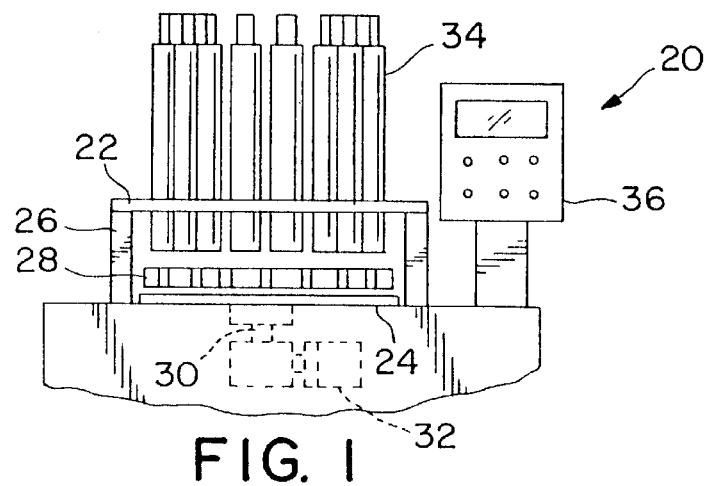
FIG. 1 is an illustration of a system embodying the invention.

Referring to FIG. 1, the system is shown generally at 20 and comprises an upper base plate 22 spaced apart from a lower base plate 24, the plates secured to one another by supports 26. A carousel 28 is rotatably secured between the upper and lower base plates 22 and 24. A shaft 30 passes through the lower base plate 24 and is secured to the carousel 28. A motor/indexer 32 drives the shaft 30 to effect rotary motion of the carousel 28. A programmable controller 36 controls the indexed movement of the carousel 28 and the actuation of reciprocating rams shown generally at 34. The rams 34 carrying feed nozzles see FIGS. 4–9, are ganged in the upper base plate 22.

Figure 3:
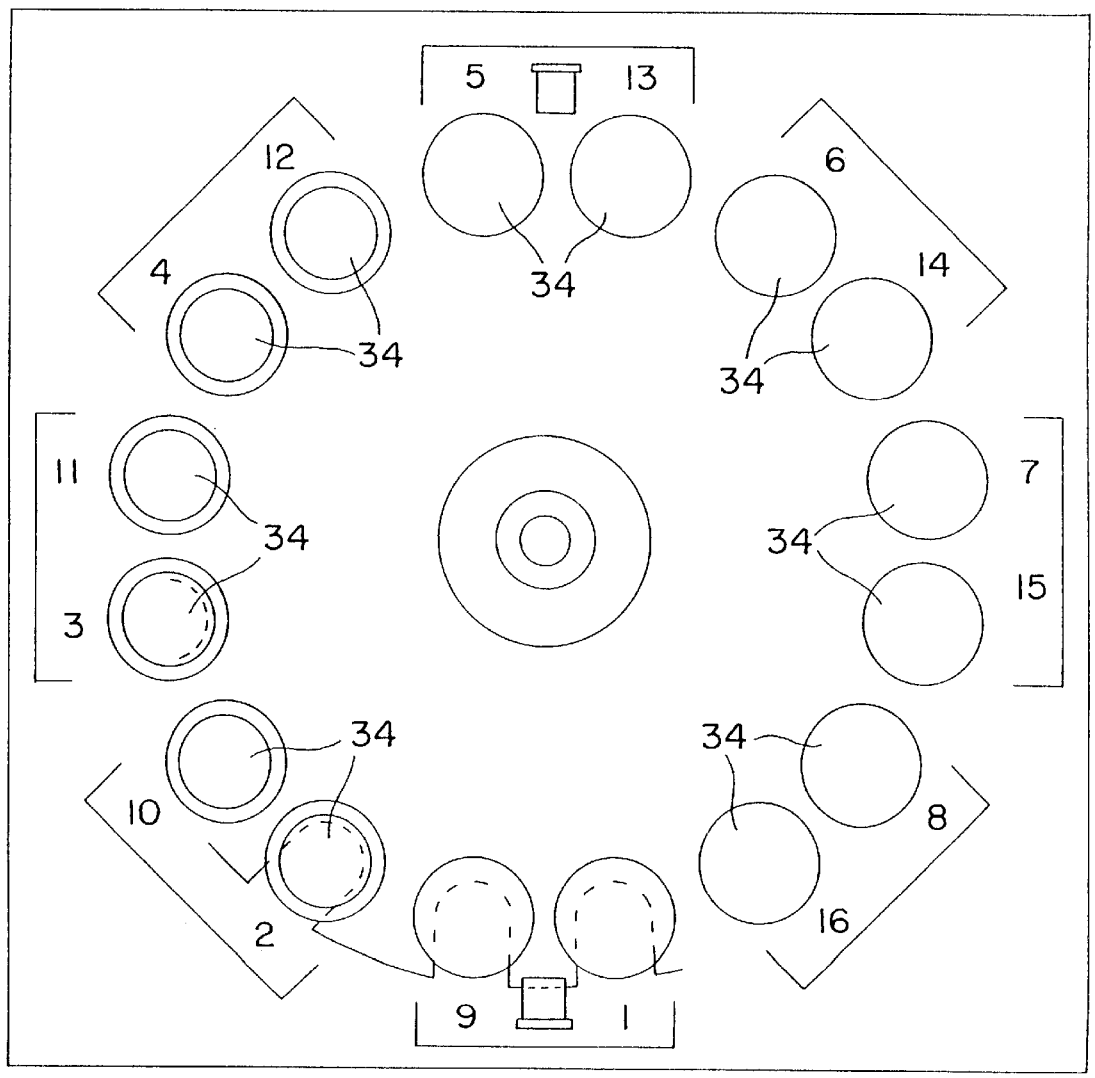
FIG. 3 is a plan view of a carousel.

Referring to FIG. 3, treatment stations, hereinafter defined, are designated 2/10, 3/11, 4/12, 5/13, 6/14, 7/15 and 8/16. Loading and unloading stations are designated 1 and 9 respectively.

Figure 2:
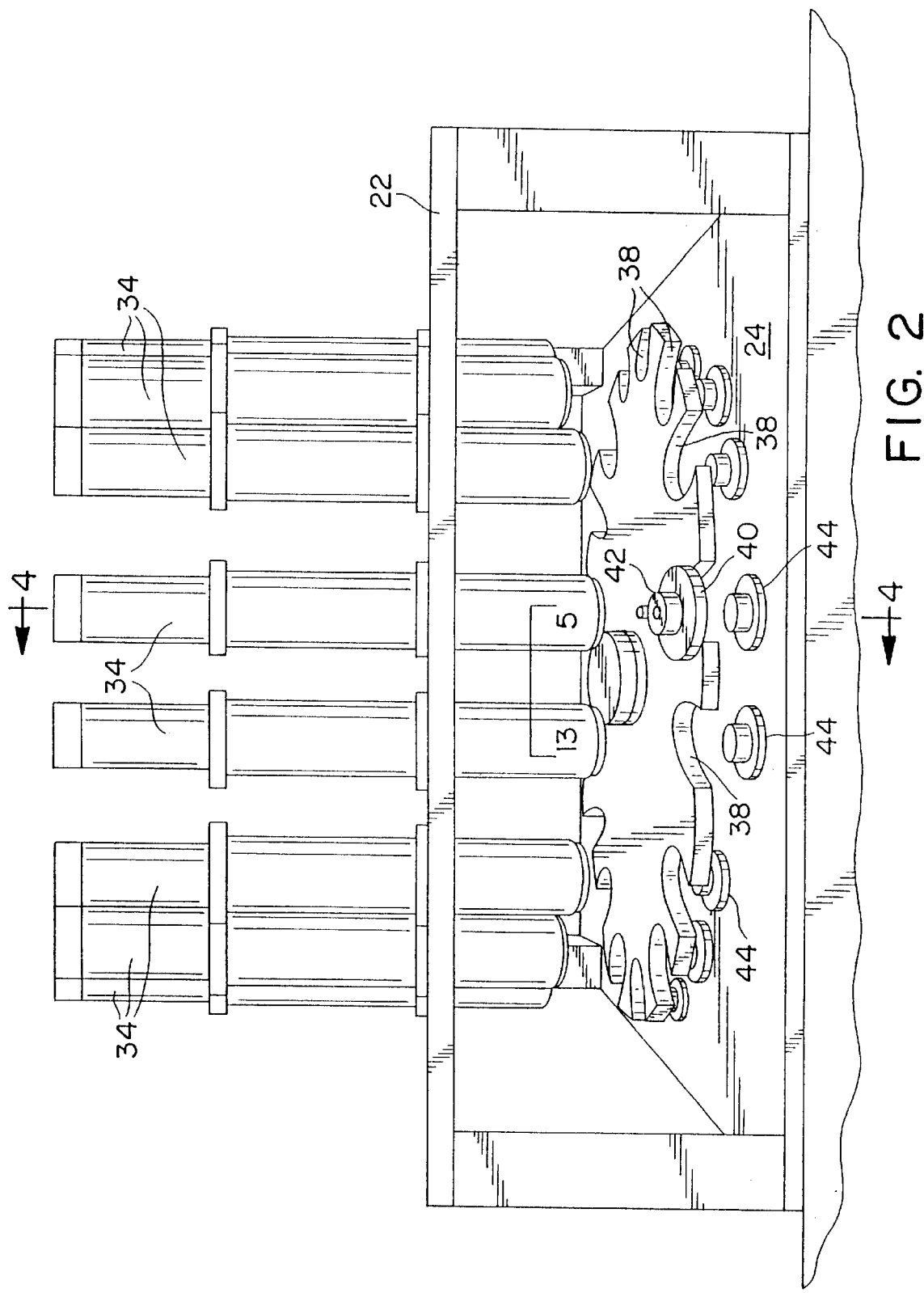
FIG. 2 is a front elevation of rams, a carousel, a lower base plate and an upper base plate.

Referring to FIG. 2, a front view of FIG. 1, the outer edge of the carousel 28 is characterized by a plurality of semi-circular recesses 38. The recesses have secured therein nests 40, only one shown in FIG. 2 at treatment station 5. Secured in the nest 40 is a workpiece, e.g. an injection nozzle, 42. The lower base plate 24 has secured therein lower tooling fixtures 44. Treatment stations comprise a ram 34, a nest 40 and a tooling fixture 44 in axial alignment. At stations 2/10 a liquid abrasive slurry flow through the injection nozzle 42 is followed by compressed air flow through the injection nozzle 42. At stations 3/11 and 8/16 compressed air flows through the injection nozzle 42 and at stations 4/12, 5/13, 6/14 and 7/15 calibration fluid flows through the injection nozzle 42 followed by compressed air flow through the injection nozzle 42. Stations 1 and 9 are nozzle loading and unloading stations.

As shown in FIG. 3, the stations are paired. The structure and function of each paired set of rams, nests and tooling fixtures are identical. For clarity, the rams, nests and tooling fixtures at each of the paired stations 2/10; 3/11; 4/12; 5/13; 6/14; 7/15 and 8/16 will be described in the singular.

Treatment Stations

Figure 4:
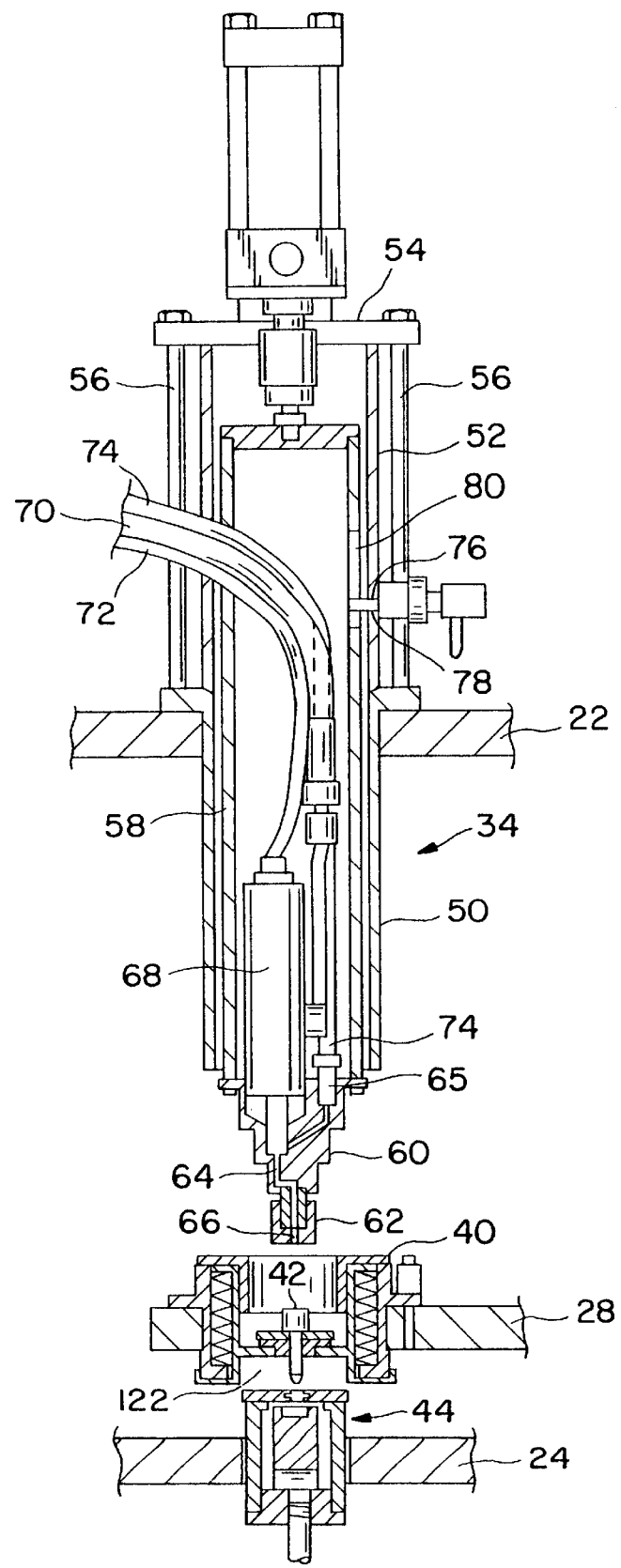
FIG. 4 is a front view of a treatment station in an unclamped position for liquid abrasive slurry showing a ram, a nest/workpiece and a lower tooling fixture.
Figure 5:
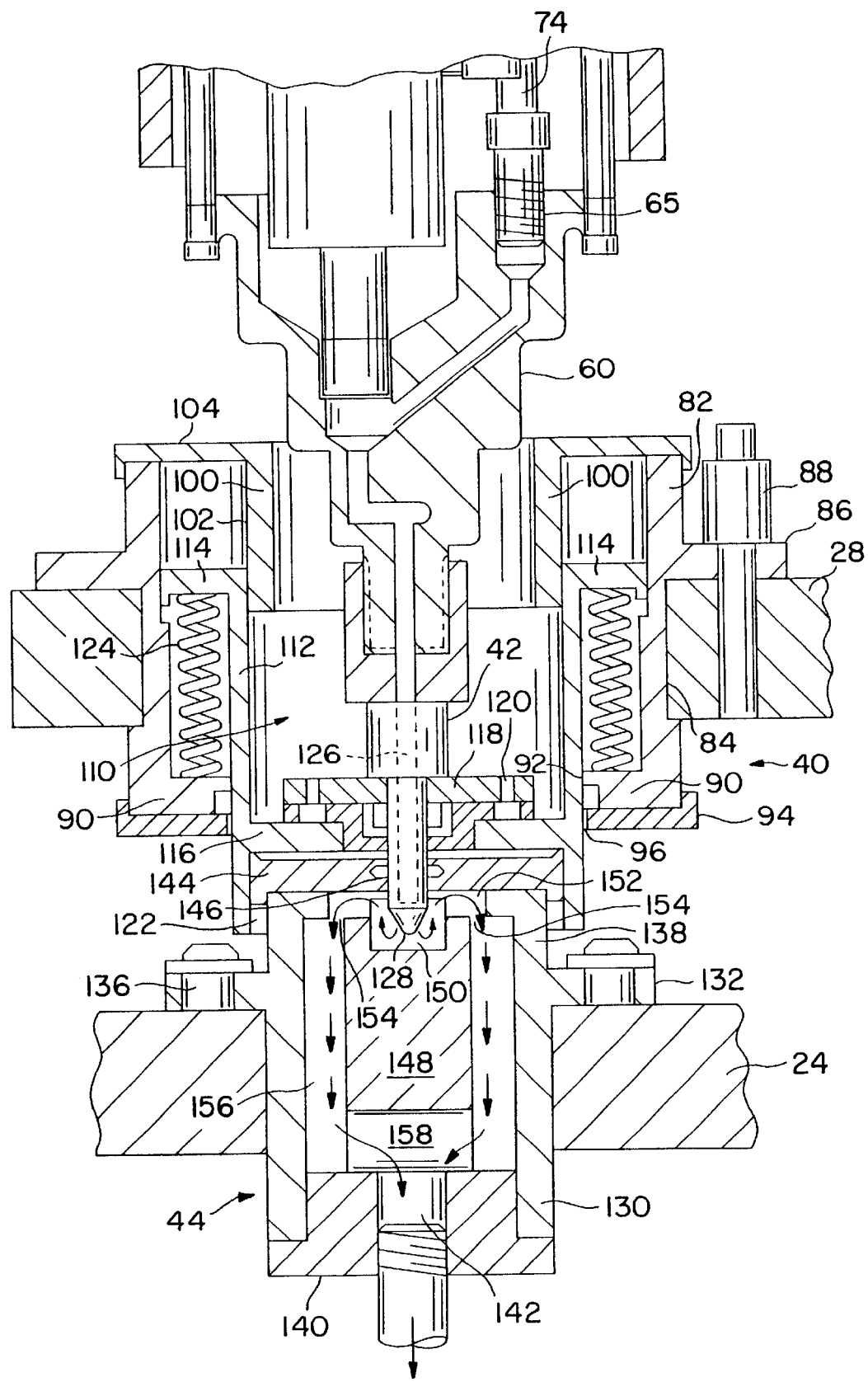
FIG. 5 shows the treatment station of FIG. 4 in a clamped position.
Figure 6:
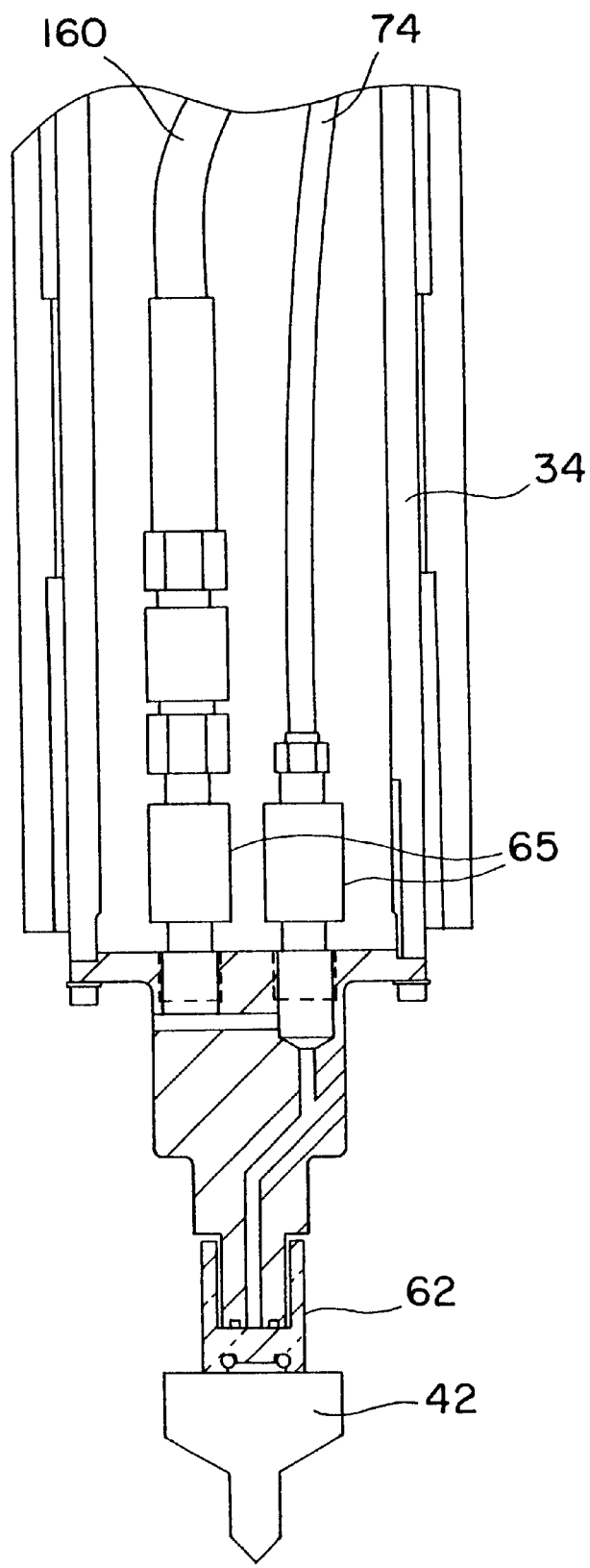
FIG. 6 is a front partial view of a ram assembly for calibration fluid internal flush/test.
Figure 7:
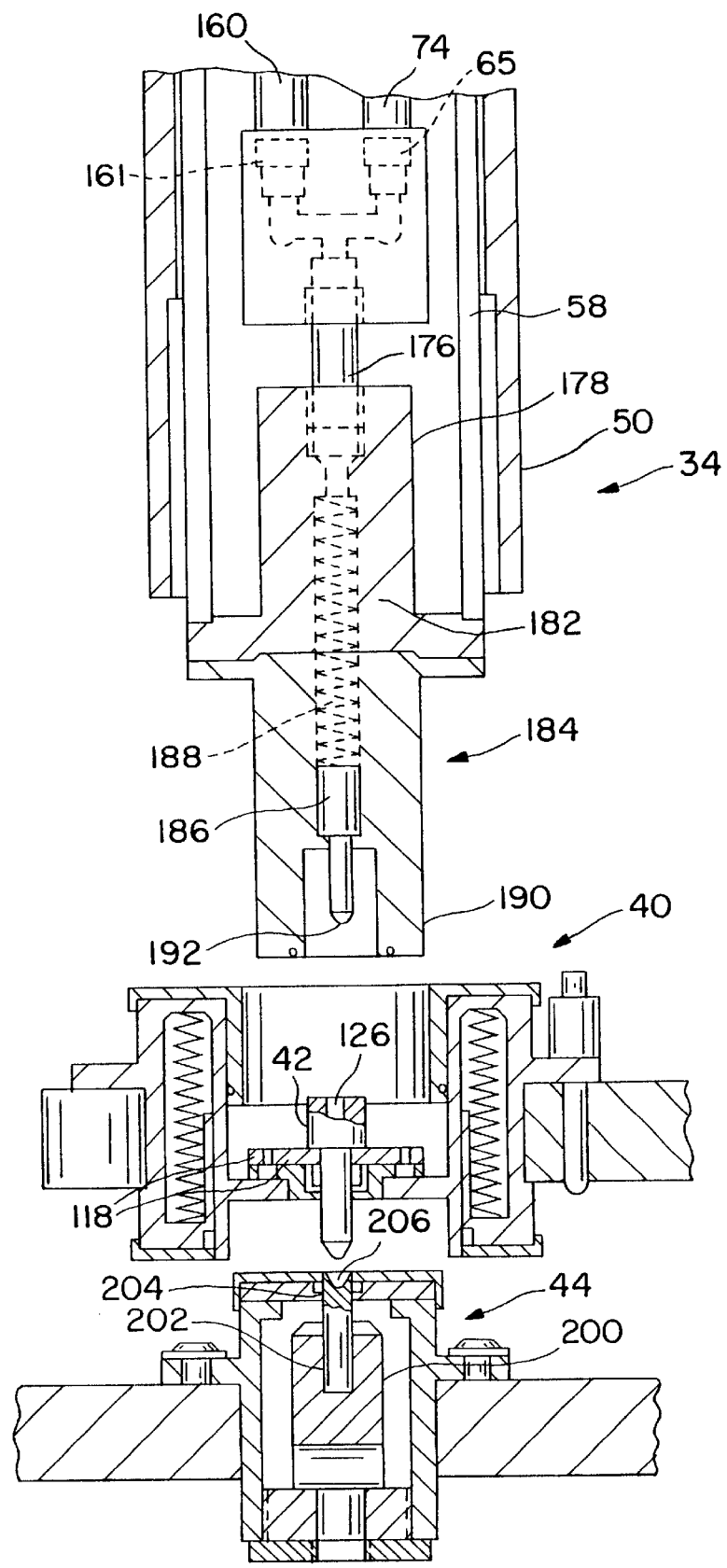
FIG. 7 is a front view of a treatment station in an unclamped position for calibration fluid external flush showing a ram, a nest/workpiece and a lower tooling fixture.
Figure 8A:
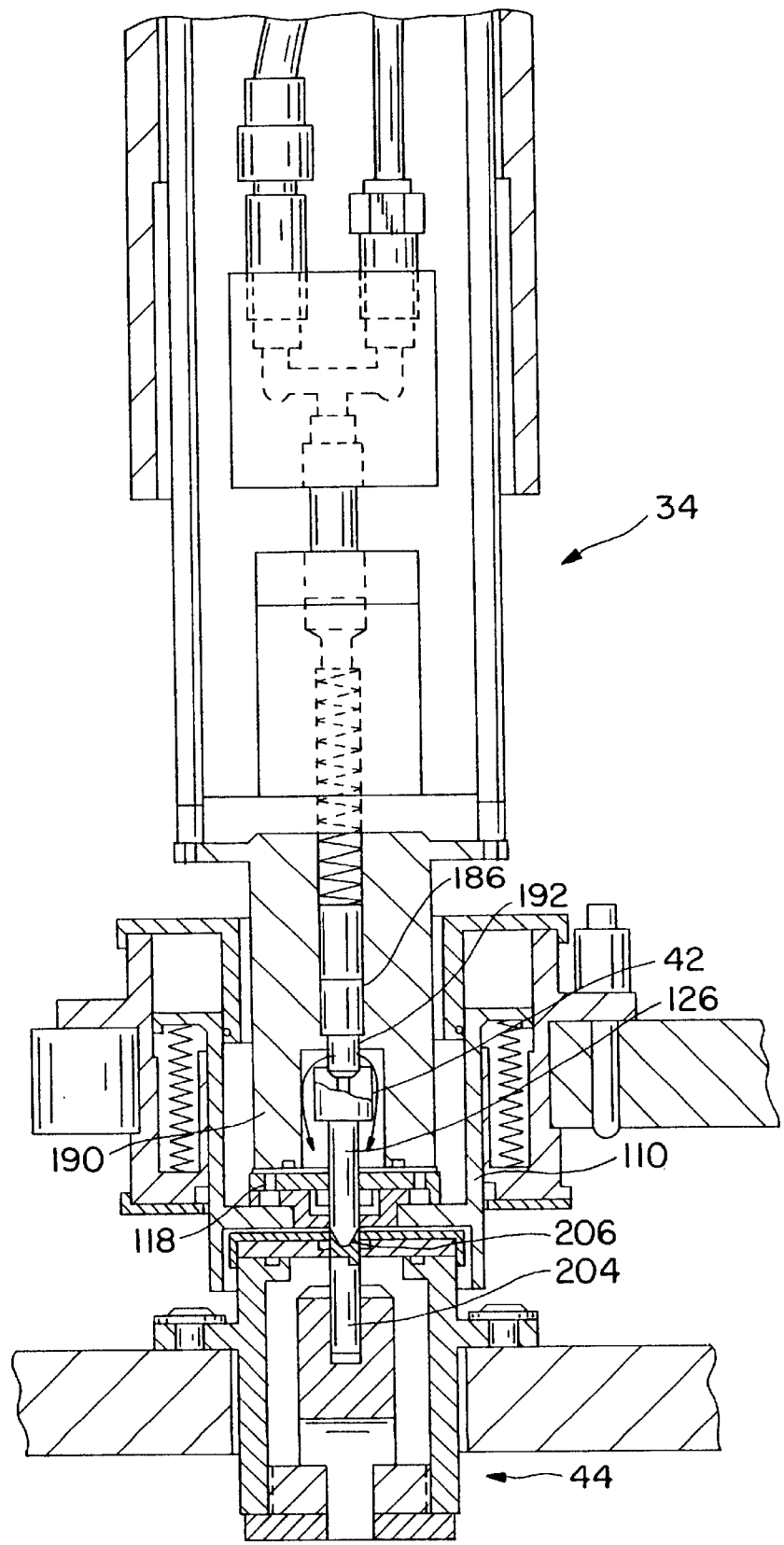
FIG. 8a shows the treatment station of FIG. 7 in a clamped position.
Figure 8B:
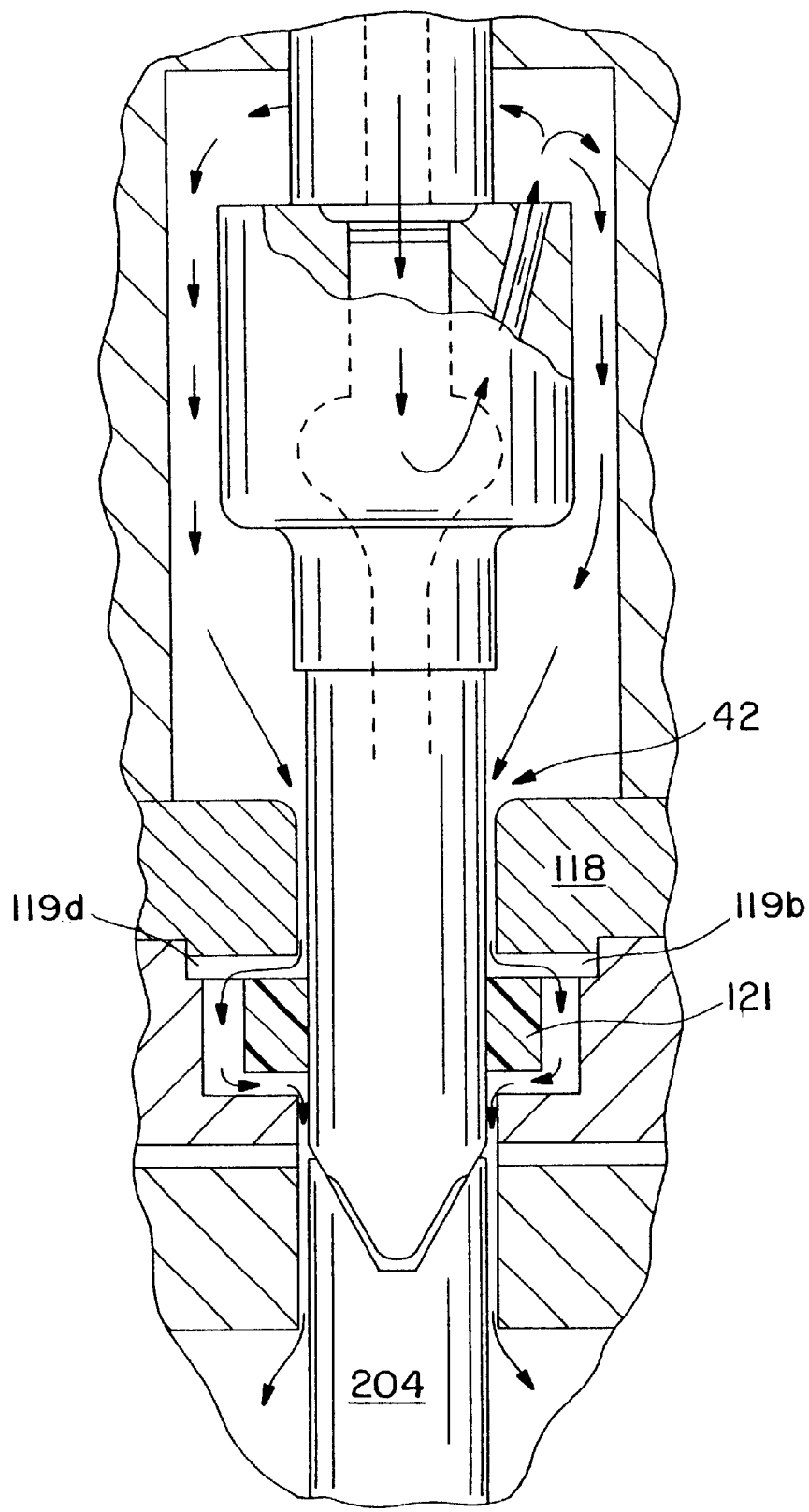
FIG. 8b illustrates the flow path of the external flush.
Figure 9:
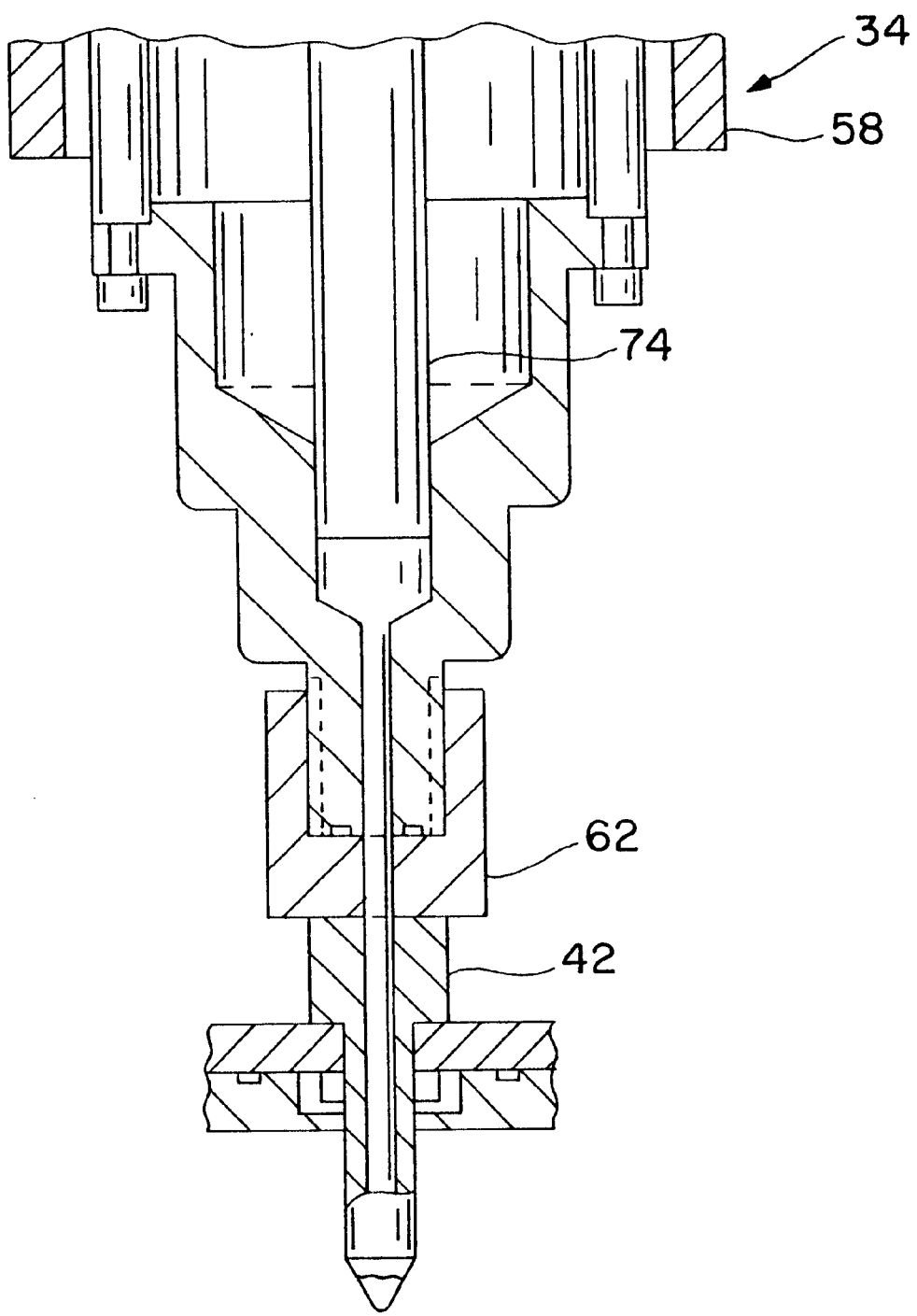
FIG. 9 is a front view of a ram assembly for pneumatic air flush.

There are four types of ram end effectors, ram effectors for liquid abrasive slurry flow, FIGS. 4 and 5, stations 2/10; ram effectors for internal flush and test calibration fluid flow, FIG. 6, stations 4/12, 6/14, 7/15; ram effectors for external calibration fluid flow, FIGS. 7 and 8, stations 5/13; and ram effectors for pneumatic air flow, FIG. 9, stations 3/11 and 8/16. The nests are identical for all treatment stations. The lower tooling fixtures for all treatment stations are substantially identical, except for the tooling fixtures at stations 5/13 (external flush) and stations 1/9 (nozzle loading/unloading). Also, the rams are modified at stations 5/13. Identical parts for the rams, nests and tooling fixtures are identified with identical numbers.

Stations 2/10

Ram

Referring to FIGS. 4–5, each station 2/10 comprises a ram for liquid abrasive slurry flow; a nest 40, the injection nozzle 42 and a lower tooling fixture 44.

The ram 34 comprises an actuator shaft housing 50 secured to the upper base plate 22. An extension tube 52 is joined to the top of the actuator shaft housing 50. Secured to the top of the extension tube 52 is a cylinder mount cap 54. Tie rods 56 join the cylinder mount cap 54, extension tube 52 and actuator shaft housing 50 to form an integral assembly. Slidably received in the extension tube 52 and actuator shaft housing 50 is an actuator shaft 58. Secured to the bottom of the actuator shaft 58 is a chuck 60 having a feed nozzle 62 secured thereto. The chuck 60 has a through port 64 which is aligned with an orifice 66 in the nozzle 62.

Secured in the actuator shaft 58 is a pneumatically operated dispensing valve 68 which communicates with and seats in the chuck 60. At the upstream end of the dispensing valve 68 is an abrasive liquid slurry supply line 70. A pneumatic air line 72 is received in the dispensing valve 68 to actuate the valve 68 as is well known to one skilled in the art. A compressed air line 74 feeds into the through port 64 through a check valve 65.

A rotational guide pin 76 passes through a hole 78 in the extension tube 52 and into a slot 80 formed on the wall of the actuator shaft 58. This prevents relative rotation among the actuator shaft 58, the extension tube 52 and the housing 50.

The Nest

Referring to FIG. 5, the nest 40 is generally cylindrical and comprises an outer sleeve 82 which has a notched outer wall 84 which notched wall 84 slides into the recess 38 in the carousel 28. The sleeve 82 is characterized by an outwardly extending flange 86. A removable pin 88 passes through the flange 86 and into the carousel 28 securing the nest 40 in the recess 38. The sleeve 82 has an inwardly extending flange 90 having an inner edge 92.

A planar ring 94 is fixedly secured to the bottom of the sleeve 82. The ring 94 has an inner edge 96.

An inner sleeve 100 has an outer surface 102 and an outwardly extending flange 104 at its upper edge which flange 104 is secured to the outer sleeve 82.

A spring loaded, cylindrical workpiece fixture 110 is slidably received between the outer sleeve 82 and the inner sleeve 100. The fixture 110 comprises a wall 112 having an outwardly extending flange 114 at its upper end. A floor 116 is spaced apart from the lower end of the wall 112 and is characterized by a central collet 118, secured to the floor 116 by threaded fasteners 120. The bottom 116 and the depending end of the wall 112 define a cylindrical recess 122, see FIG. 4.

The flange 114 of the fixture 110 is received between the opposed surfaces of the outer and inner sleeves 82 and 100. The edges 92 of the flange 90 and the edge 96 of the ring 94, locate and guide the fixture 110 as it moves between an engaged and disengaged position with reference to the tooling fixture 44. Springs 124 are seated between the opposed surfaces of the flanges 90 and 114 and bias the fixture 110 away from the tooling fixture 44.

The injection nozzle 42 is secured in the collet 118. The injection nozzle 42 has a through passage 126 and microholes 128 which are to be smoothed and radiused.

Tooling Fixture

The tooling fixture 44 comprises a sleeve 130 having an outwardly extending flange 132. The sleeve 130 is received in the lower base plate 24 and secured thereto by threaded fasteners 136. At the upper end of the sleeve 130 is a lip 138 which extends inwardly. A cap 140 having a central port 142 is secured to and closes the bottom of the sleeve 130. A cap plate 144 having a central aperture 146 is secured to and closes the top of the sleeve 130. A cylinder 148 is secured within the sleeve 130 and has a chamber 150 formed in its upper end. The upper edge of the cylinder 148 is spaced apart from the opposed surface of the cap plate 144 and defines an opening 152 therebetween. The inner edges of the lips 138 are spaced apart from the opposed outer surfaces of the cylinder 148 and define a passageway 154 therebetween. The outer surface of the cylinder 148 and the opposed surface of the sleeve 130 define a sleeve-like passageway 156 and a through hole 158 is formed in the bottom of the cylinder 148.

The flow path of fluids passing from the microholes 128 of the injection nozzle 42 and through the tooling fixture 44 is indicated by the arrows. This flow path is the same for the liquid abrasive slurry, calibration fluid (internal flush and test) and pneumatic air. The liquids (slurry and calibration fluid) are discharged from the microholes into the chamber 150, which during a treatment step is filled with liquid. That is, the liquid slurry and calibration fluid are discharged into a liquid reservoir. This enhances the accuracy of the measurements.

Stations 4/12, 6/14 and 7/15

Referring to FIG. 6, each station 4/12, 6/14 and 7/15 comprises a ram having calibration fluid feed line 160 and the compressed air feed line 74 with a check valve 65. The feed line 160 replaces the line 70 and valve 68 of FIGS. 4 and 5. At these stations, the nest 40 and lower tooling fixture 44 are as previously described. At these stations, the calibration fluid flows, as shown for the slurry in FIGS. 4 and 5, through the injection nozzle 42.

Stations 5/13

At treatment stations 5/13 an external flush is effected. That is, calibration fluid flows externally of the injection nozzle 42. Referring to FIG. 7, the ram 34, nest 40 and lower tooling fixture 44 are shown in an unclamped position and in FIG. 8a they are shown in a clamped position.

Received in the actuator shaft 58 are the two feed lines, a line 160 for calibration fluid and the line 74 for compressed air, each fitted with a check valve 161 and 65 respectively. Fluids discharged from these feed lines 160 and 74 flow through a common port 176 which extends into an upper nozzle mount 178. A lower nozzle mount 184 abuts the upper nozzle mount 178 and has a through port 182. The upper nozzle mount 178 is secured to the bottom of the actuator shaft 58 and the lower nozzle mount 184 is secured to the upper nozzle mount 178. A guide pin 186 is seated in the lower nozzle mount 184 and is biased downwardly. A spring 188 is secured between the upstream end of the block 180 and the upstream end of the guide pin 186.

The lower nozzle mount 184 includes a depending sleeve 190 and the discharge end of the nozzle 186 is received in the sleeve. The nozzle 186 has apertures 192.

With reference to the tooling fixture 44 of FIG. 5, the block 148 of FIG. 5 is replaced by a block 200 which block 200 is characterized by a cylindrical recess 202 having a post 204 received therein. The post 204 has a concave end 206 which mates with the tip of the injection nozzle 42.

As shown in FIG. 8a, when the ram 34 moves to the closed position, the tip of the guide pin 186 seats in the upstream end of the injection nozzle 42 sealing the passageway 126. The sleeve 190 engages the collet 118. The workpiece fixture 110 moves downwardly, as previously described, but the post 204 prevents movement of the injection nozzle 42 because the tip of the injection nozzle 42 seats in the concave surface 206 of the post 204. The inner diameter of the sleeve 190 is greater than the diameter of the head of the injection nozzle 42.

Referring to FIG. 8b, four equally spaced radial slots 119a–119d (only 119b and 119d shown) are formed in the collet 118 to allow the fluid to flow around a retaining ring 121.

Figure 10:
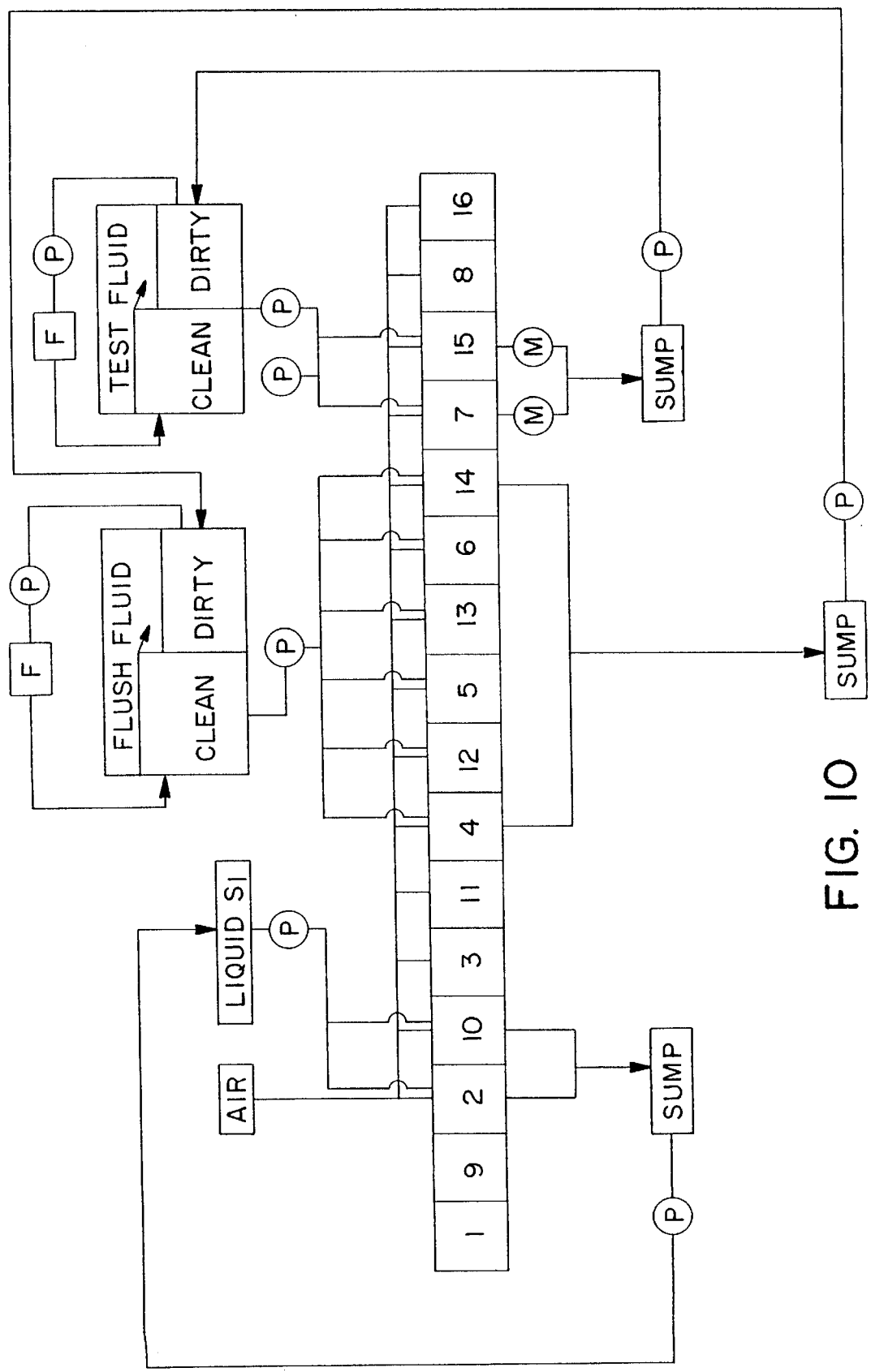
FIG. 10 is a process flow diagram.

Calibration fluid flows through the tip 192 exteriorally of the injection nozzle 42, through the central opening of the collet 118 and into the lower tooling fixture 44 from which it is ultimately discharged. The calibration fluid then flows into a return sump (FIG. 10).

Stations 3/11 and 8/16

Referring to FIG. 9, for stations 3/11 and 8/16, the ram 34 comprises only the compressed air feed line 74. The nest 40 and lower tooling fixture 44 are as described for FIGS. 4 and 5. At these stations the air flows through the injection nozzle 42 as described for FIGS. 4 and 5.

Operation of the Invention

Referring to FIG. 10, a generalized process flow diagram is shown for the stations with a pump $P_1$ for the liquid abrasive slurry, a pump $P_2$ for the test calibration fluid, a pump $P_3$ for flush calibration fluid and pressure and flow meters, P and F respectively.

The programmable controller controls all the steps in the treatment cycle, e.g. pressures, duration of flow, and sequential movement of the rams and the carousel. The controller also compares the flow rate of the calibration fluid at stations 7/15 with the historical flow rates of the same fluid through like nozzles and based on that comparison determines the duration of the liquid slurry flow required at treatment stations 2/10 for the target smoothness and radiusing.

The liquid slurry suitable for purposes of the invention, but for illustrative purposes only, is such as described in the aforementioned PCT Publication. A typical calibration fluid is "viscor" calibration fluid #3112, Type II, Rocky Valley Oil Company. Again, this particular calibration fluid is only exemplary.

In the preferred embodiment, the calibration fluid is used both for the internal and external flushes of the injection nozzle and in the actual calibration step. The invention will be described with reference to polishing and radiusing microholes and an injector nozzle, six microholes 0.008 inches diameter.

The operation of the invention will be described with reference to stations 1–8, the functions and structures of the stations 9–16 being identical.

Referring to the FIGS. 1–3, at station 1, the injection nozzle 42 is inserted into the nest 40. The carousel indexes the injection nozzle 42 to station 2. At station 2, the ram 34 moves from its unclamped to clamped position, FIGS. 4 and 5, the valve 68 is actuated and the liquid abrasive slurry flows through the nozzle 62 and through the injection nozzle 42 and out through the microholes 128. A typical pressure and time would be between 200–900 psi 10–30 seconds, typically 400 psi for 20 seconds. After the valve 68 closes, compressed air flows through the compressed air line 74 through the port 64 and through the injection nozzle 42. A typical pressure and duration would be 80 psi for 5–10 seconds.

While the injection nozzle 42 is at treatment station 2, an injection nozzle 42 is being loaded into the carousel 28 at station 1. The loading of nozzles 42 at station 1 continues in seriatim during the processing of the nozzles 42 previously loaded and indexed.

The carousel 28 rotates and indexes the injection nozzle 42 to station 3, FIG. 9. At station 3, the ram 34 moves to the clamped position, compressed air flows through the injection nozzle 42 at a pressure of 80 psi for a duration of 20 seconds.

For the preferred embodiment, injector nozzles 42 are inserted into the nests 40 at both stations 1 and 9 and processed in parallel. It is within the scope of the invention that the system can function with single stations, e.g. only stations 1–8 or with three or more stations where three or more injector nozzles are processed in parallel.

The carousel 28 rotates to bring the injection nozzle 42 to station 4 for an internal flush, see FIG. 6. The ram 34 moves to its clamped position with the nozzle 62 engaging the injection nozzle 42. Calibration fluid at a pressure of 500 psi and for a duration of 20 seconds flows through the injection nozzle 42.

After the flow of calibration fluid stops, compressed air, line 74, flows through the injection nozzle 42 at a pressure of 80 psi and for a duration of 5 seconds.

The carousel 28 rotates indexing the injection nozzle 42 to treatment station 5 where there is an external flush of the injection nozzle 42 by the calibration fluid, FIGS. 7 and 8a and 8b. The calibration fluid at a pressure of 50 psi and for a duration of 20 seconds flows about the injection nozzle 42. Subsequently compressed air, line 74, at a pressure of 80 psi and for a duration of 5 seconds flows exteriorally of the injection nozzle 42.

The carousel 28 then indexes the injection nozzle 42 to treatment station 6 where again, in an identical manner as for station 4, there is an internal flush of the injection nozzle 42 with calibration fluid followed by a compressed air cleaning flow.

The carousel 28 then indexes the injection nozzle 42 to treatment station 7 where the flow rate of the calibration fluid through the injection nozzle 42 is measured. This measurement determines the length of time that the abrasive slurry will flow through the injection nozzle 42 when the injection nozzle 42 is indexed to treatment station 2.

The carousel 28 then indexes the injection nozzle 42 to treatment station 8 where the injection nozzle 42 is flushed clean with compressed air as described for treatment station 3.

The carousel then indexes the injection nozzle 42 to station 1. However, in the first rotation of the injection nozzle 42 it is not unloaded at station 1. The injection nozzle 42 is not unloaded until the injection nozzle 42 has rotated a second time through treatment stations 2 through 8.

In the second rotation, the carousel 28 indexes the injection nozzle 42 to treatment station 2.

At station 2, based on the measurement of the flow rate from station 7, the liquid slurry flows through the injection nozzle 42 at a pressure of 200–900 psi typically 400 psi and for a calculated duration of e.g. between 0–30 seconds. This duration will, of course, vary depending on the calculated time from the flow rate reading. It will be understood that the times for slurry flow through the nozzles 42 in stations 2/10, second rotation will vary. After both slurry flows are finished the carousel 28 indexes.

The injection nozzle 42 is then indexed and treated as previously described at stations 3, 4, 5 and 6. At station 7, the flow rate of the calibration fluid is measured and this determines if the microholes have been properly smoothed and radiused. The injection nozzle 42 is indexed to station 8 where it is cleaned as previously described with compressed air and subsequently indexed to station 1 where it is unloaded, assuming it was properly smoothed and radiused, and a new injection nozzle is loaded.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described our invention, what we now claim is:

1. A system to smooth and radius a microhole in a workpiece to calibrate the microhole, the workpiece secured in a nest comprising:

a plurality of nests on a platform;

means for indexing in timed sequence the nests through a plurality of treatment stations and a feed nozzle associated with each treatment station adapted to releasably engage the workpiece;

means for flowing an abrasive material through the microhole at a treatment station while the associated feed nozzle is engaged to the workpiece;

means for flowing a fluid through the microhole a first time at a treatment station while the associated feed nozzle is engaged to the workpiece to flush the microhole;

means for flowing a fluid externally of the workpiece at a treatment station while the associated feed nozzle is engaged to the workpiece;

means for flow calibration fluid though the microhole at a workstation while the associated feed nozzle is engaged to the workpiece;

means for flowing abrasive slurry the microhole at a treatment station while the associated feed nozzle is engaged to the workpiece for predetermined time based on the flow rate of the calibration fluid through the microhole to calibrate the microhole; and means for flowing air through the microhole at a treatment station while the associated feed nozzle is engaged to the workpiece, the treatment station being positioned downstream of the treatment station where the calibration fluid flows through the microhole.

2. The system of claim 1 wherein the platform is circular and comprising means for rotating the nests through the stations.

3. The system of claim 1 wherein the feed nozzle is adapted for reciprocating movement along an axis which axis is perpendicular to the plane through which the nests are indexed.

4. The system of claim 1 wherein there are a plurality of feed nozzles ganged in an upper base plate spaced apart from the platform.

5. The system of claim 4 wherein the workpieces are in register with the stations when the nests are not being indexed.

6. The system of claim 1 comprising:

means for removing fluids from the nests.

7. The system of claim 1 wherein the means for flowing a liquid abrasive fluid through the microhole in the workpiece is at a first treatment station; and comprising:

means for controlling the pressure and the duration of the flow of the liquid abrasive material, said duration based on the prior flow rate of a calibration fluid through said microhole.

8. The system of claim 7 wherein the nest is indexed to a second treatment station comprising:

means for flowing the calibration fluid through the microhole in the workpiece; and means for measuring the flow rate of the calibration fluid through the microhole.

9. The system of claim 8 comprising:

means for indexing the nest to a third treatment station; and means for flowing the liquid abrasive material through the microhole in the workpiece to precondition the microhole.

10. The system of claim 9 wherein there is a fourth treatment station comprising:

means for flowing a calibration fluid through the microhole in the workpiece to determine if the microhole is properly calibrated.

11. The system of claim 1 which comprises:

means for flowing air through the microhole at a treatment station while the associated feed nozzle is engaged to the workpiece, the treatment station being positioned upstream of the treatment station where the abrasive material flows through the microhole.

12. The system of claim 11 which comprises:

means for flowing air through the microholes after the flow of the abrasive material, the fluid and the calibration fluid through the microhole; and means for flowing air externally of the microhole after the flow of the fluid externally of the microhole while the associated feed nozzles are engaged to the workpiece.

13. The system of claim 11 wherein the treatment station where the abrasive material flows through the microhole is a second treatment station and which system comprises:

a first treatment station for flowing air through the microhole upstream of the second treatment station;

wherein the treatment station for flowing the fluid a first time to flush through the microhole is a third treatment station downstream of the second treatment station;

wherein the treatment station for flowing the fluid for the external flush is a fourth treatment station downstream of the third treatment station;

further comprising a fifth treatment station for flowing the fluid the second time through the workpiece to flush the microhole, the fifth treatment station downstream of the fourth treatment station for the external flush and said fifth treatment station is upstream of the treatment station for flowing the calibration fluid through the microhole which is a sixth treatment station; and a seventh treatment station downstream of the sixth treatment station for flowing the air through the microhole.

14. The system of claim 11 comprising:

means for cleaning the microhole between the third and fourth stations.

* * * * *